(12) United States Patent　(10) Patent No.: US 8,990,120 B2
Cirulli et al.　(45) Date of Patent: Mar. 24, 2015

(54) LEVERAGING PROCUREMENT ACROSS COMPANIES AND COMPANY GROUPS

(71) Applicant: International Business Machines Corporation, Armonk, NY (US)

(72) Inventors: Susan B. Cirulli, Simpsonville, SC (US); Robert M. Evans, Binghamton, NY (US); Gerald R. Robinson, Horseheads, NY (US); Sherry L. Wilson, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/149,097

(22) Filed: Jan. 7, 2014

(65) Prior Publication Data

US 2014/0122193 A1　May 1, 2014

Related U.S. Application Data

(60) Continuation of application No. 11/643,193, filed on Dec. 21, 2006, now Pat. No. 8,666,903, which is a division of application No. 09/815,312, filed on Mar. 22, 2001, now Pat. No. 7,155,403.

(51) Int. Cl.
*G06Q 20/00*　(2012.01)
*G06Q 30/06*　(2012.01)
(Continued)

(52) U.S. Cl.
CPC .......... *G06Q 30/0605* (2013.01); *G06Q 20/204* (2013.01); *G06Q 20/3674* (2013.01); *G06Q 20/382* (2013.01); *G06Q 30/02* (2013.01); *G06Q 40/12* (2013.01); *G06Q 30/0207* (2013.01)
USPC ......................................................... 705/64

(58) Field of Classification Search
USPC ............ 705/16, 21, 59, 71; 380/44, 262, 278, 380/279
See application file for complete search history.

(56) References Cited

U.S. PATENT DOCUMENTS 5,615,109 A　*　3/1997　Eder ............................ 705/7.12
5,621,201 A　*　4/1997　Langhans et al. ............. 235/380
(Continued)

FOREIGN PATENT DOCUMENTS

GB　　　2082814 A　　3/1982
WO　　WO 98/49639　　11/1998

OTHER PUBLICATIONS

Lotus Development Corp., an IBM Subsidiary. Lotus Domino: Application Development with Domino Designer, Rel. 5. USA, privately printed, 1998. i-vii, 425-430.
(Continued)

*Primary Examiner* — Dante Ravetti
(74) *Attorney, Agent, or Firm* — Schmeiser, Olsen & Watts, LLP; John R. Pivnichny

(57) ABSTRACT

A method and system for providing procurement services to customer companies. A user profile for each user, in a computer database, specifies: (i) each user is authorized by a first customer company of the customer companies to access procurement resources and the procurement services for purchasing items and (ii) the first customer company and a first company group of related customer companies. Access to volume discounts with respect to vendors is provided to all customer companies in the first company group. Companies are authorized to have access to and share each procurement resource, by providing a resource profile specifying for each procurement resource a set of customer companies authorized for accessing and sharing each procurement resource to be shared among the users. Access to the procurement resources is controlled resources based on: the first company group, the first customer company, and the resource profile for each procurement resource.

20 Claims, 10 Drawing Sheets

(51) Int. Cl.
*G06Q 20/20* (2012.01)
*G06Q 20/36* (2012.01)
*G06Q 20/38* (2012.01)
*G06Q 30/02* (2012.01)
*G06Q 40/00* (2012.01)

(56) References Cited

U.S. PATENT DOCUMENTS

| | | | |
|---|---|---|---|
| 6,023,729 A * | 2/2000 | Samuel et al. | 709/228 |
| 6,031,984 A | 2/2000 | Walser | |
| 6,055,516 A * | 4/2000 | Johnson et al. | 705/26.8 |
| 6,055,519 A * | 4/2000 | Kennedy et al. | 705/80 |
| 6,102,969 A * | 8/2000 | Christianson et al. | 717/146 |
| 6,151,582 A | 11/2000 | Huang et al. | |
| 6,199,113 B1 * | 3/2001 | Alegre et al. | 709/229 |
| 6,256,773 B1 | 7/2001 | Bowman-Amuah | |
| 6,260,065 B1 | 7/2001 | Leiba et al. | |
| 6,594,819 B1 | 7/2003 | Ciarlante et al. | |
| 6,611,822 B1 | 8/2003 | Beams et al. | |
| 6,631,402 B1 | 10/2003 | Devine et al. | |
| 7,143,420 B2 | 11/2006 | Radhakrishnan | |
| 7,162,427 B1 | 1/2007 | Myrick et al. | |
| 7,243,077 B2 | 7/2007 | Broden et al. | |
| 7,313,568 B2 | 12/2007 | Cutlip et al. | |
| 7,363,246 B1 | 4/2008 | Van Horn et al. | |
| 7,437,675 B2 | 10/2008 | Casati et al. | |
| 8,589,251 B2 | 11/2013 | Broden et al. | |
| 8,589,275 B2 | 11/2013 | Cirulli et al. | |
| 2001/0011222 A1 * | 8/2001 | McLauchlin et al. | 705/1 |
| 2001/0032162 A1 | 10/2001 | Alsberg et al. | |
| 2001/0051913 A1 * | 12/2001 | Vashistha et al. | 705/37 |
| 2002/0019740 A1 | 2/2002 | Matsuo et al. | |
| 2002/0069102 A1 | 6/2002 | Vellante et al. | |
| 2002/0104071 A1 | 8/2002 | Charisius et al. | |
| 2002/0198727 A1 | 12/2002 | Ann et al. | |
| 2003/0140128 A1 | 7/2003 | Cox et al. | |
| 2003/0149685 A1 | 8/2003 | Trossman et al. | |
| 2003/0158842 A1 | 8/2003 | Levy et al. | |
| 2003/0197743 A1 | 10/2003 | Hill et al. | |
| 2004/0078275 A1 * | 4/2004 | Ismert et al. | 705/26 |
| 2004/0230464 A1 | 11/2004 | Bliss, Jr. et al. | |
| 2005/0002380 A1 | 1/2005 | Miller et al. | |
| 2005/0027858 A1 | 2/2005 | Sloth et al. | |
| 2005/0049910 A1 | 3/2005 | Lancaster et al. | |
| 2005/0066015 A1 | 3/2005 | Dandekar et al. | |
| 2005/0097016 A1 * | 5/2005 | Barnard et al. | 705/30 |
| 2005/0198486 A1 | 9/2005 | Desmond et al. | |
| 2006/0041935 A1 | 2/2006 | Conley et al. | |
| 2006/0129419 A1 | 6/2006 | Flaxer et al. | |
| 2006/0171538 A1 | 8/2006 | Larson et al. | |
| 2006/0271390 A1 | 11/2006 | Rich et al. | |
| 2006/0283938 A1 | 12/2006 | Kumar et al. | |
| 2007/0136676 A1 | 6/2007 | Kruempelmann et al. | |
| 2008/0077873 A1 | 3/2008 | Peterson | |
| 2008/0204452 A1 | 8/2008 | Lau | |
| 2009/0031234 A1 | 1/2009 | McKay | |

OTHER PUBLICATIONS

Lotus Development Corp., an IBM Subsidiary. Lotus Domino: Domino Enterprise Integration Guide, Rel. 5. USA, privately printed, 1998. 9-20, 107-122, 444-451.
Berners-Lee et al.; "Uniform Resource Locators (URL)"; Request for Comments (RFC) 1738; Dec. 1994. (as cited on PTO-892 of related U.S. Appl. No. 09/657,215, now Patent 6,965,938 issued Nov. 15, 2005).
Brown et al.; "Mastering Lotus Notes"; pp. 6-15, 486-483; ISBM 0782113028; 1995. (as cited on PTO-892 of related U.S. Appl. No. 09/657,215, now Patent 6,965,938 issued Nov. 15, 2005).
Office Action (Mail Date Aug. 19, 2009) for U.S. Appl. No. 11/159,918, filed Jun. 23, 2005.
Office Action (Mail Date Mar. 10, 2010) for U.S. Appl. No. 11/120,678, filed May 3, 2005.
Notice of Allowance (Mail Date May 18, 2010) for U.S. Appl. No. 11/135,599, filed May 23, 2005.
Notice of Allowance (Mail Date Mar. 3, 2011) for U.S. Appl. No. 11/807,324, filed May 25, 2007.
Notice of Allowance (Mail Date Mar. 9, 2012) for U.S. Appl. No. 13/198,755, filed Aug. 5, 2011.
Office Action (Mail Date Apr. 3, 2012) for U.S. Appl. No. 13/184,682, filed Jul. 18, 2011.
Notice of Allowance (Mail Date May 20, 2011) for U.S. Appl. No. 09/819,462, filed Mar. 28, 2001.
Office Action (Mail Date Oct. 8, 2010) for U.S. Appl. No. 11/807,324, filed May 25, 2007.
Office Action (Mail Date Oct. 27, 2010) for U.S. Appl. No. 11/983,111, filed Nov. 6, 2007.
Office Action (Mail Date Sep. 21, 2011) for U.S. Appl. No. 13/198,755, filed Aug. 5, 2011.
Preliminary Amendment (Dec. 21, 2006) for U.S. Appl. No. 11/643,193, filed Dec. 21, 2006.
Restriction Requirement (Mail Date Mar. 17, 2009) for U.S. Appl. No. 11/643,193, filed Dec. 21, 2006.
Response (Apr. 14, 2009) for U.S. Appl. No. 11/643,193, filed Dec. 21, 2006.
Office Action (Mail Date Apr. 29, 2009) for U.S. Appl. No. 11/643,193, filed Dec. 21, 2006.
Response (Jul. 27, 2009) for U.S. Appl. No. 11/643,193, filed Dec. 21, 2006.
Final Office Action (Mail Date Nov. 25, 2009) for U.S. Appl. No. 11/643,193, filed Dec. 21, 2006.
Final Response (Jan. 19, 2010) for U.S. Appl. No. 11/643,193, filed Dec. 21, 2006.
Advisory Action (Mail Date Mar. 2, 2010) for U.S. Appl. No. 11/643,193, filed Dec. 21, 2006.
Response (May 17, 2010) for U.S. Appl. No. 11/643,193, filed Dec. 21, 2006.
Advisory Action (Mail Date Jun. 8, 2010) for U.S. Appl. No. 11/643,193, filed Dec. 21, 2006.
RCE (Jul. 17, 2010) for U.S. Appl. No. 11/643,193, filed Dec. 21, 2006.
Office Action (Mail Date Sep. 21, 2012) for U.S. Appl. No. 11/643,193, filed Dec. 21, 2006.
Response (Dec. 21, 2012) for U.S. Appl. No. 11/643,193, filed Dec. 21, 2006.
Final Office Action (Mail Date Apr. 10, 2013) for U.S. Appl. No. 11/643,193, filed Dec. 21, 2006.
Final Response (Jun. 10, 2013) for U.S. Appl. No. 11/643,193, filed Dec. 21, 2006.
Advisory Action (Mail Date Sep. 13, 2013) for U.S. Appl. No. 11/643,193, filed Dec. 21, 2006.
Notice of Allowance (Mail Date Oct. 11, 2013) for U.S. Appl. No. 11/643,193, filed Dec. 21, 2006.
Tewari et al.; "High Availability in Clustered Multimedia Servers"; Proceedings of the Twelfth International Conference on Data Engineering; pp. 645-654; Feb. 1996. (as cited on PTO-892 of related U.S. Appl. No. 09/657,215, now Patent 6,965,938 issued Nov. 15, 2005).
Cardellini et al.; "Redirection algorithims for load sharing in distributed Web-server systems"; Proceedings. 19th IEEE International Conference on Distributed Computing Systems; pp. 528-535; May 1999. (as cited on PTO-892 of related U.S. Appl. No. 09/657,215, now Patent 6,965,938 issued Nov. 15, 2005).
John D'Esposito. Proxy Pass Implementation in GWA. Undated. 13 pages. Published before Sep. 6, 2000 on the Internet at <htt;://w3.ibm.com/media/juke/presenter/gwa/proxy/proxy.html>. (as cited on related U.S. Appl. No. 09/657,217, now Patent 6,947,063 issued Sep. 20, 2005).
Sun Microsystems, Inc. Java 2 Enterprise Edition Technical Documentation. Copyright 1999. 1 page. (cited on related U.S. Appl. No. 09/656,803, now Patent 6,772,167 issued Aug. 3, 2004).
Sun Microsystems, Inc. Java 2 Enterprise Edition Developer's Guide. Copyright 1999. Table of Contents (7 pages) and Chapter 8 "Security" (10 pages). (cited on related U.S. Appl. No. 09/656,803, now Patent 6,772,167 issued Aug. 3, 2004).

(56) References Cited

OTHER PUBLICATIONS

Dynamic HTML in Action Written by William J. Pardi and Eric Schurman, 1998. (as cited on PTO-892 of related U.S. Appl. No. 09/657,195, now Patent 6,886,134 issued Apr. 26, 2005.

Gershenfeld, Nancy; "Client-server: What Is It and Are We There Yet?" Online. Medford: Mar. 1995. vol. 19, Iss. 2; p. 60, 6 pages. (as cited on PTO-892 of related U.S. Appl. No. 09/819,462).

University of New Hampshire Financial and Administrative Procedures, 1994, 11 pages. (as cited on PTO-892 of related U.S. Appl. No. 09/819,462).

Minnesota Statewide Administrative Systems webpage describing three way match, Jun. 29, 1995, 1 page. (as cited on PTO-892 of related U.S. Appl. No. 09/819,462).

US Dept. of Energy, I-Manage Stars Functional and Technical Requirements, Sep. 2000, 54 pages. (as cited on PTO-892 of related U.S. Appl. No. 09/819,462).

X12 Transaction Set Index Version 3040, undated, 4 pages. (as cited on PTO-892 of related U.S. Appl. No. 09/819,462).

All Open Orders for Customer, Nov. 23, 1999, Motorola. (cited by examiner—as cited on Patent 6,922,671 issued Jul. 26, 2005 for related case [U.S. Appl. No. 09/815,320]).

Elaine Marmel and Diane Koers, Peachtree 8 for Dummies, © 2000, Hungry Minds, Inc. (cited by examiner—as cited on Patent 6,922,671 issued Jul. 26, 2005 for related case [U.S. Appl. No. 09/815,320]).

David Kroenke, Database Processing, © 1983, 1977, Science Research Associates, Inc.

Deitel & Deitel, Java How to Program, © 1998, 1997, Prentice-Hall. (cited by examiner—as cited on Patent 6,922,671 issued Jul. 26, 2005 for related case [U.S. Appl. No. 09/815,320]).

State of Texas Statewide Electronic Commerce Feasibility Study; May 15, 1998; Phoenix Planning & Evaluation, Ltd. Rockville, MD 20852.x. (cited by examiner—as cited on Patent 6,922,671 issued Jul. 26, 2005 for related case [U.S. Appl. No. 09/815,320]).

Yehuda Shiran; Sharing functions between frames, Jul. 29, 2000. (as cited on PTO-892 of related U.S. Appl. No. 09/815,316, now Patent 6,971,107 issued Nov. 29, 2005).

JavaScrip and Frames, Part II—The Famous Memory Game, Apr. 5, 1999. (as cited on PTO-892 of related U.S. Appl. No. 09/815,316, now Patent 6,971,107 issued Nov. 29, 2005.

Tom Negrino, JavaScript for the World Wide Web: Visual QuickStar Guide (3rd Edition), 2000. (as cited on PTO-892 of related U.S. Appl. No. 09/815,613, now Patent 6,971,107 issued Nov. 29, 2005).

\* cited by examiner

LEVERAGING PROCUREMENT ACROSS COMPANIES AND COMPANY GROUPS

This application is a continuation application claiming priority to Ser. No. 11/643,193, filed Dec. 21, 2006, which is a divisional of Ser. No. 09/815,312, filed Mar. 22, 2001, U.S. Pat. No. 7,155,403, issued Dec. 26, 2006.

CROSS REFERENCES TO RELATED APPLICATIONS

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";

Ser. No. 09/657,216, filed 7 Sep. 2000, entitled "System and Method for Front End Business Logic and Validation";

Ser. No. 09/657,217, filed 7 Sep. 2000, entitled "System and Method for Data Transfer With Respect to External Applications";

Ser. No. 09/656,037, filed 7 Sep. 2000, entitled "System and Method for Providing a Relational Database Backend";

Ser. No. 09/656,803, filed 7 Sep. 2000, entitled "System and Method for Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files";

Ser. No. 09/657,195, filed 7 Sep. 2000, entitled "System and Method for Providing an Application Navigator Client Menu Side Bar".

Ser. No. 09/819,462, filed 28 Mar. 2001, entitled "SYSTEM AND METHOD FOR AUTOMATING INVOICE PROCESSING WITH POSITIVE CONFIRMATION";

Ser. No. 09/815,318, filed 22 Mar. 2001, entitled "SYSTEM AND METHOD FOR GENERATING A COMPANY GROUP USER PROFILE";

Ser. No. 09/819,437, filed 28 Mar. 2001, entitled "SYSTEM AND METHOD FOR SHARING DATA ACROSS FRAMES USING ENVIRONMENT VARIABLES";

Ser. No. 09/815,317, filed 22 Mar. 2001, entitled "SYSTEM AND METHOD FOR SYNCHRONIZING LEDGER ACCOUNTS BY COMPANY GROUP";

Ser. No. 09/815,320, filed 22 Mar. 2001, entitled "SYSTEM AND METHOD FOR GROUPING COMPANIES ACCORDING TO ACCOUNTING SYSTEM OR RULES";

Ser. No. 09/815,316, filed 22 Mar. 2001, entitled "SYSTEM AND METHOD FOR FRAME STORAGE OF EXECUTABLE CODE";

Ser. No. 09/815,313, filed 22 Mar. 2001, entitled "SYSTEM AND METHOD FOR INVOICE IMAGING THROUGH NEGATIVE CONFIRMATION PROCESS";

Ser. No. 09/816,264, filed 23 Mar. 2001, entitled "SYSTEM AND METHOD FOR PROCESSING TAX CODES BY COMPANY GROUP"; and Ser. No. 09/978,598, filed 2 Mar. 2001, filed 2 Mar. 2001, entitled "SYSTEM AND METHOD FOR MANAGING INTERNET TRADING NETWORKS".

The above-identified patent applications are incorporated herein by reference.

BACKGROUND OF THE INVENTION

1. Technical Field of the Invention

This invention pertains to a requisition and catalog system. More particularly, it relates to a leveraged procurement network (LPN) system for leveraging purchasing across company and company groups.

2. Background Art

Previously, an enterprise company provided procurement services to a customer company. The back end system for supporting these procurement services is bridged to a front end requisition and catalog system (Req/Cat Web, or RCW server) with which users from the customer company would interface to view a catalog of commodities and/or services and enter requisition requests.

When the enterprise company provides such procurement services to more than one customer company, it has heretofore been required to rewrite the front end system to accommodate the accounting rules required to support the procurement activities of each additional company. This is time consuming and complex. There is, therefore, a need in the art to provide a system and method whereby an enterprise may provide procurement services to a plurality of customer companies using the same front end requisition and catalog system for them all.

However, the data and accounting for one customer company must be isolated from viewing or use by other customer companies.

The Internet provides exchange mechanisms where suppliers bring goods and services to be offered and malls for shoppers to obtain them. These exchange mechanisms are largely independent with a single company selling and an individual from another company shopping. Generally, if companies wish to partner to gain advantage either from consolidating purchase volumes to obtain better prices or from creating a complete palette of business goods and services to establish a 'one stop shop', many individual relations are established and managed independently. Manual integration of systems to ensure members rights and responsibilities are met increase the bureaucracy and paperwork. Should a company endeavor to participate or host multiple trading networks, the membership management becomes very difficult.

There is, therefore, a need in the art for a system and method whereby an enterprise may leverage purchases by a plurality of customer companies for which it is providing procurement services against a common contract having volume specific terms and conditions.

It is an object of the invention to provide an improved system and method for procuring goods and services on behalf of customer companies.

It is a further object of the invention to provide a system and method for leveraging purchases of goods and services against the same volume specific contract by a plurality of unrelated customer companies.

It is a further object of the invention to provide a system and method for providing procurement services to a plurality of companies organized according to groups of related companies sharing access to selected resources across company groups and access to other resources only within company groups.

It is a further object of the invention to provide a system and method for leveraging purchasing across company groups while isolating information to individual company groups.

SUMMARY OF THE INVENTION

A system and method for providing procurement services to a plurality of customer companies, the method including the steps of establishing a user profile for each person authorized by a customer company to access procurement services; associating each company with a company group of related companies; the user profile specifying for each user a user company and company group; providing for each procurement resource to be shared among users a resource profile specifying for each resource those companies to have access to the procurement resource; and responsive to the user profile and resource profiles, controlling user access to the procurement resources.

In accordance with an aspect of the invention, there is provided a computer program product configured to be operable for providing procurement services to a plurality of customer companies.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiments of the invention, a front end order system, such as a procurement catalog and requisition system, is enabled to accommodate multiple business with complex accounting rules while providing secure information viewing in support of those businesses and their processes. Companies having common ownership, and therefore similar accounting systems, are grouped in procurement coalitions for volume discounts or access to shared contracts. Such contracts and other resources may also be leveraged across company groups.

Figure 1:
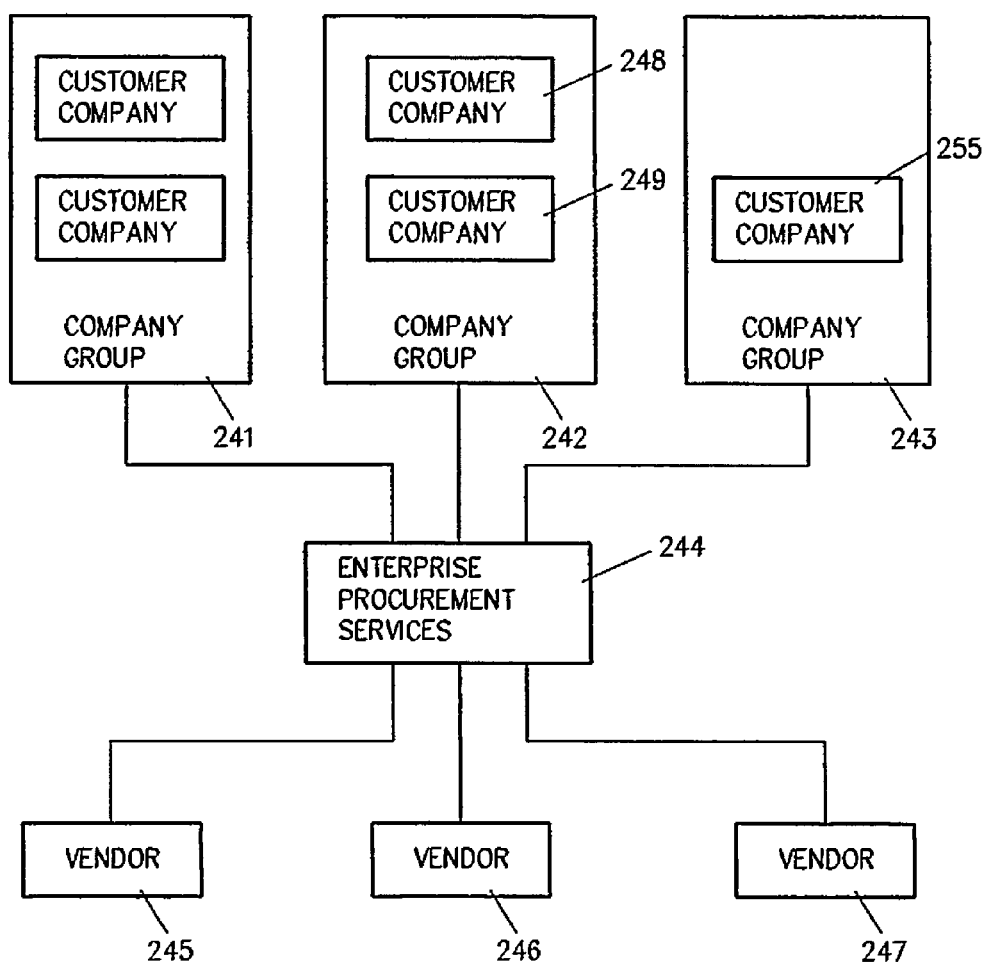
FIG. 1 is a high level system diagram illustrating an enterprise system for providing procurement services with respect to a plurality of vendors on behalf of a plurality of company groups of related customer companies in accordance with the preferred embodiment of the invention.

Referring to FIG. 1, the procurement services organization of an enterprise 244 provides procurement services to a plurality of companies 248, 249 organized in a plurality of company groups 241-243 with respect to a plurality of vendors 245-247.

Figure 2:
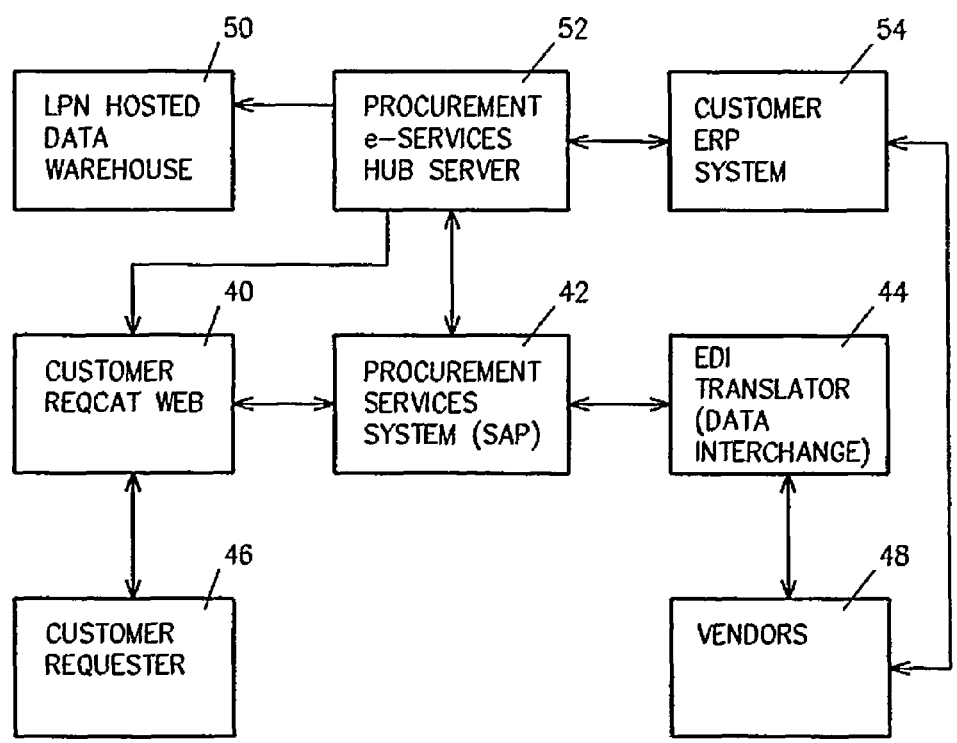
FIG. 2 is a high level system diagram illustrating the LPN application architecture of the preferred embodiment of the invention.

Referring to FIG. 2, the architecture of system components administered by enterprise 244 includes a customer requisition and catalog (ReqCatWeb, or RCW) system 40, an enterprise procurement services system (SAP) 42, an enterprise data interchange, or EDI translator system 44, an enterprise (LPN) hosted data warehouse 50, an enterprise procurement hub server 52. Also illustrated in FIG. 2 are a customer requester web terminal 46 and vendors 48.

ReqCatWeb 40 is a front-end interface between the user and the procurement system, providing access to catalogs and commodities, to order the day-to-day items required for the business.

SAP 42 is the back-end purchasing engine of the enterprise, such as is supported by IBM, accepting the requisitions from the front-end ReqCatWeb 40, and generating EDI transactions, as well as the accounting transactions for the requisitions, etc.

EDI (Electronic Data Interchange) 44 is an application that interacts with suppliers by sending standardized transactions for purchase orders, receiving invoices, etc.

LPN Hosted DataWarehouse 50 is a data-warehouse facility for storing all transactions that occur in the system; used as a tool for monitoring transactions and gathering statistics.

Hub Server 52 is a back-end processing server for transferring data between elements (that is, servers) of the system.

Customer ERP System 54 is a back-end purchasing system as supported by the customer.

Figure 3:
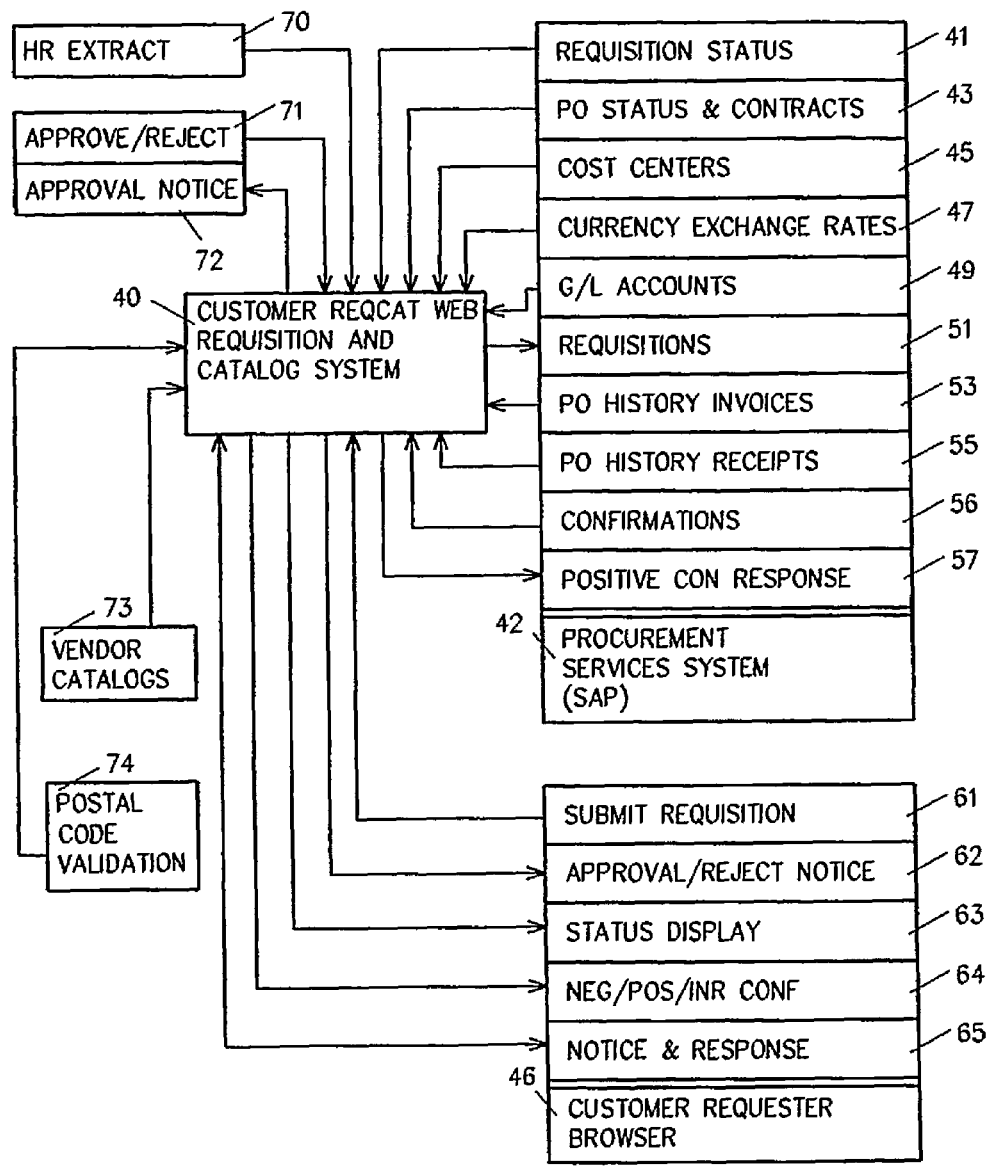
FIG. 3 is a diagram illustrating the inputs and outputs of the customer requisition catalog (RCW) component of the architecture of FIG. 2.

Referring to FIG. 3, the inputs to customer RCW system 40 from procurement services system 42 include requisition status 41, purchase order (PO) status and contracts 43, cost centers 45, currency exchange rates 47, general ledger (G/L) accounts 49, PO history invoices 53, PO history receipts 55, and confirmations 56. The outputs from customer RCW system 40 to procurement services system 42 include requisitions 51 and positive confirmation responses 57.

The inputs to customer RCW system 40 from a customer requester browser 46 include submit requisition, and outputs from system 40 to browser 46 include approval/rejection notice 62, status display 63, and negative/positive/INR confirmation. Notice and response data 65 is exchanged between RCW system 40 and browser 46.

Other inputs to RCW system 40 include vendor catalogs 73 from vendors 245-247 via enterprise EDI translator 44, postal code validation data 74 from an enterprise RCW system (not shown), and human resource extract data 70 from enterprise hub server 52. RCW system 40 also provides approval notices 72 and receives approve/reject data 71 with respect to customer approvers.

Figure 4:
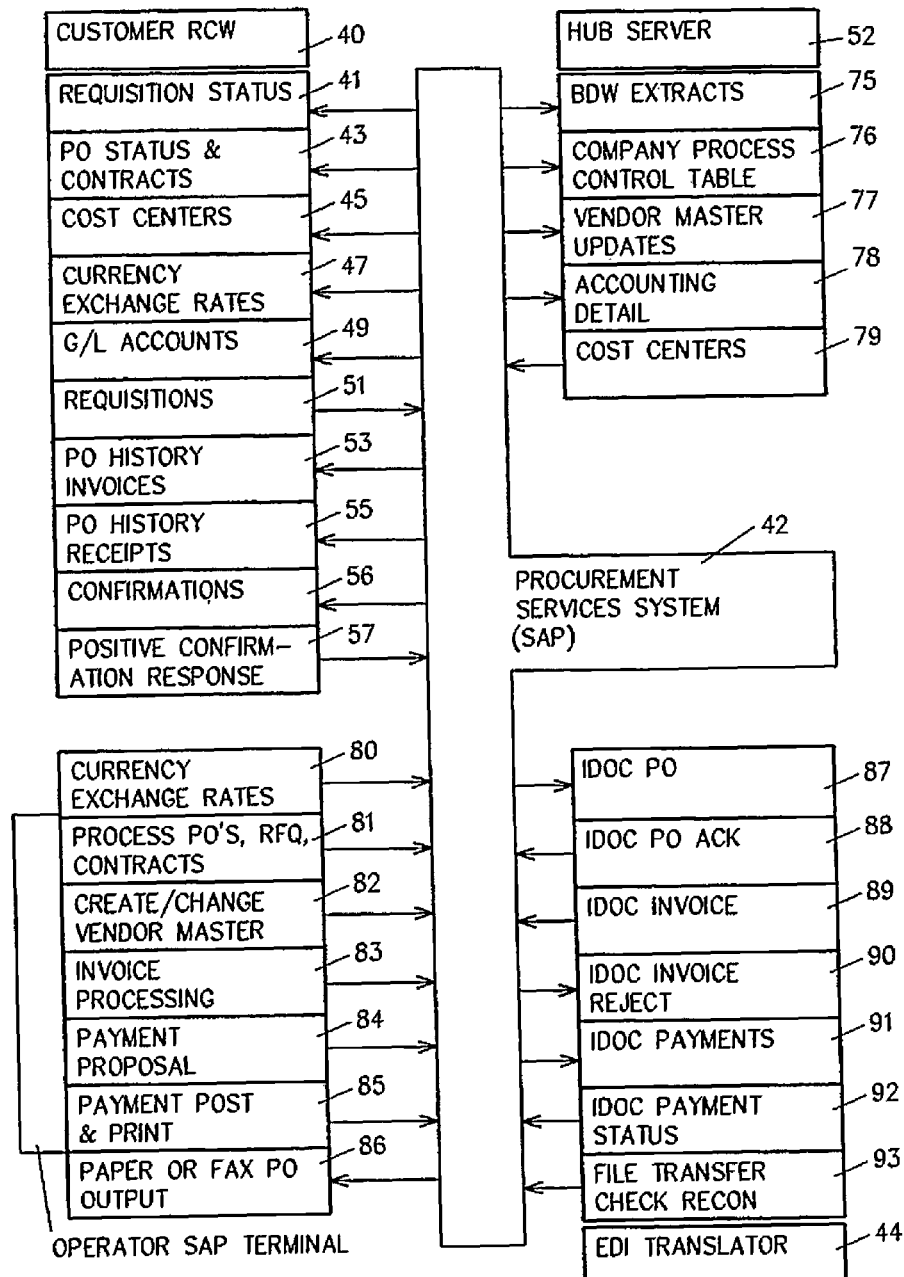
FIG. 4 is a diagram illustrating, inter alia, the inputs and outputs of the enterprise EDI translator 44 of the architecture of FIG. 2.

Referring to FIG. 4, enterprise procurement services system 42 receives as inputs from customer RCW system 40 requisitions 51 and positive confirmation responses 57, and provides to customer RCW system 40 requisition status data, purchase order status and contracts data 43, cost center data 45, currency exchange rates 47, G/L accounts 49, PO history invoices 53, PO history receipts 55, and confirmations 56.

Inputs to procurement services system 42 from hub server 52 include cost center data 79, and outputs to hub server 52 include BDW extracts, company process control table 76, vendor master updates 77, and accounting detail 78.

Inputs to procurement services system 42 from enterprise EDI translator 44 include IDOC PO acknowledgment 88, IDOC invoices 89, IDOC payment status 92 and file transfer check reconstruction 93. Outputs to EDI translator include IDOC PO 87, IDOC invoice rejection 90 and IDOC payments 91.

Inputs to enterprise procurement services system 42 from SAP operator terminals include process PO's, RFQ, and contracts data 81, create/change vendor master data 82, invoice processing 83 (which is one input to a general procurement invoicing function within procurement services system 42), payment proposal data 84, and payment post and print 85. Also input to procurement services system 42 is currency exchange rate data 80 from an external financial services server (not shown) via an enterprise currency exchange rates server (not shown), and output from procurement services system 42 to vendors 48 are paper or fax PO documents 86.

Figure 5:
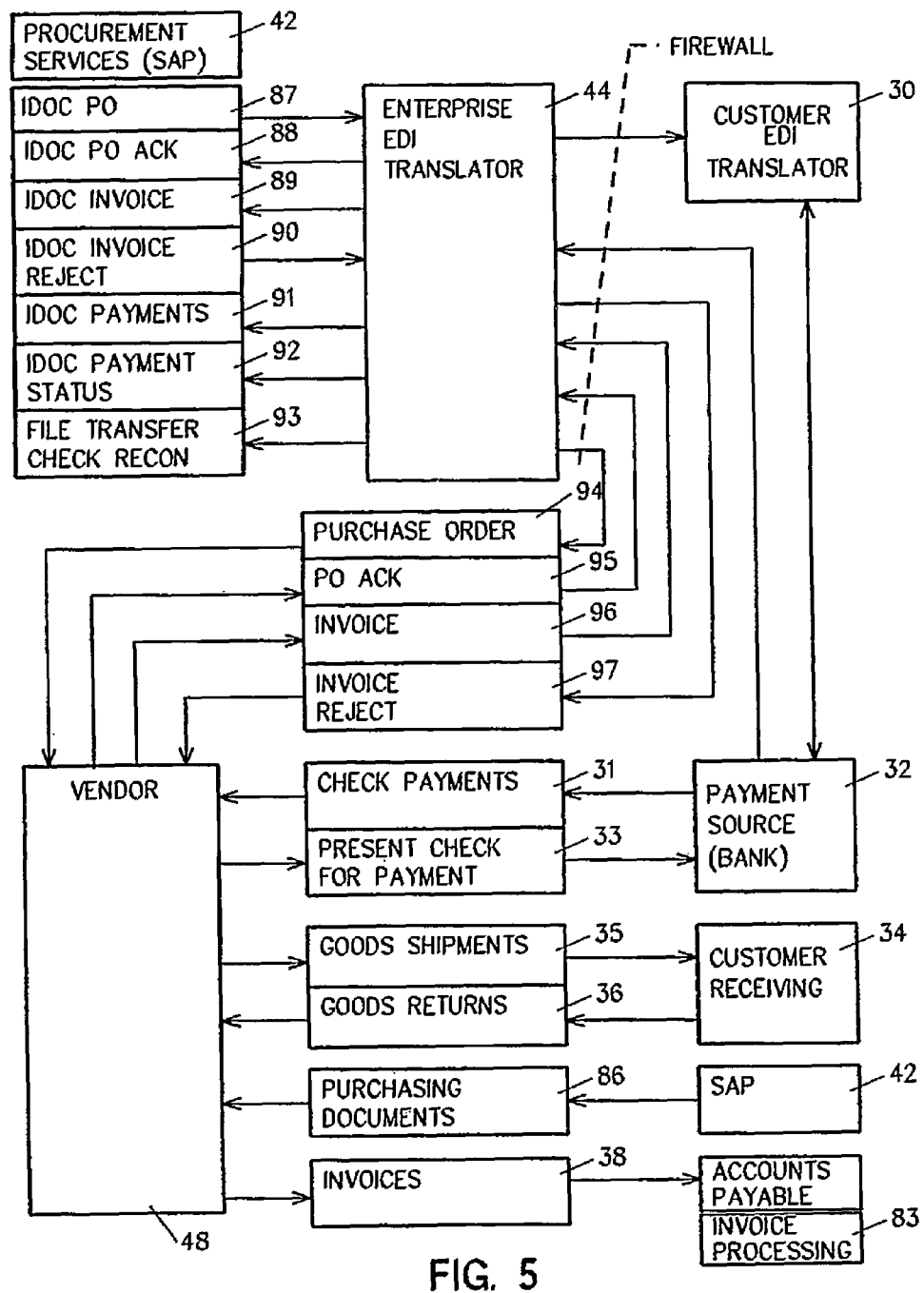
FIG. 5 is a diagram illustrating the inputs and outputs of the enterprise procurement services system 42 of the architecture of FIG. 2.

Referring to FIG. 5, inputs to enterprise EDI translator 44 from procurement services system 42 include IDOC PO 87 and IDOC invoice reject 90, and outputs to SAP system 42 include IDOC PO acknowledge 88, IDOC invoice 89, IDOC payments 91, IDOC payment status 92 and file transfer check reconstruction 93.

Inputs to enterprise EDI translator 44 from vendor 48 include PO acknowledge 95 and invoice 96, and outputs to vendor 48 include purchase order 94 and invoice reject 97. EDI translator also receives payments 32 from source 32 and provides payments to customer EDI translator 30. Bank 32 provides cashed checks and payment status to EDI translator 44. Vendor 48 provides goods shipments 35 to customer receiving 34, and receives back goods returns 36. Vendor 48 receives paper or fax purchasing documents 37 from SAP 42, and provides paper invoices 38 to enterprise accounts payable for invoice processing 83 at SAP 42.

Figure 6:
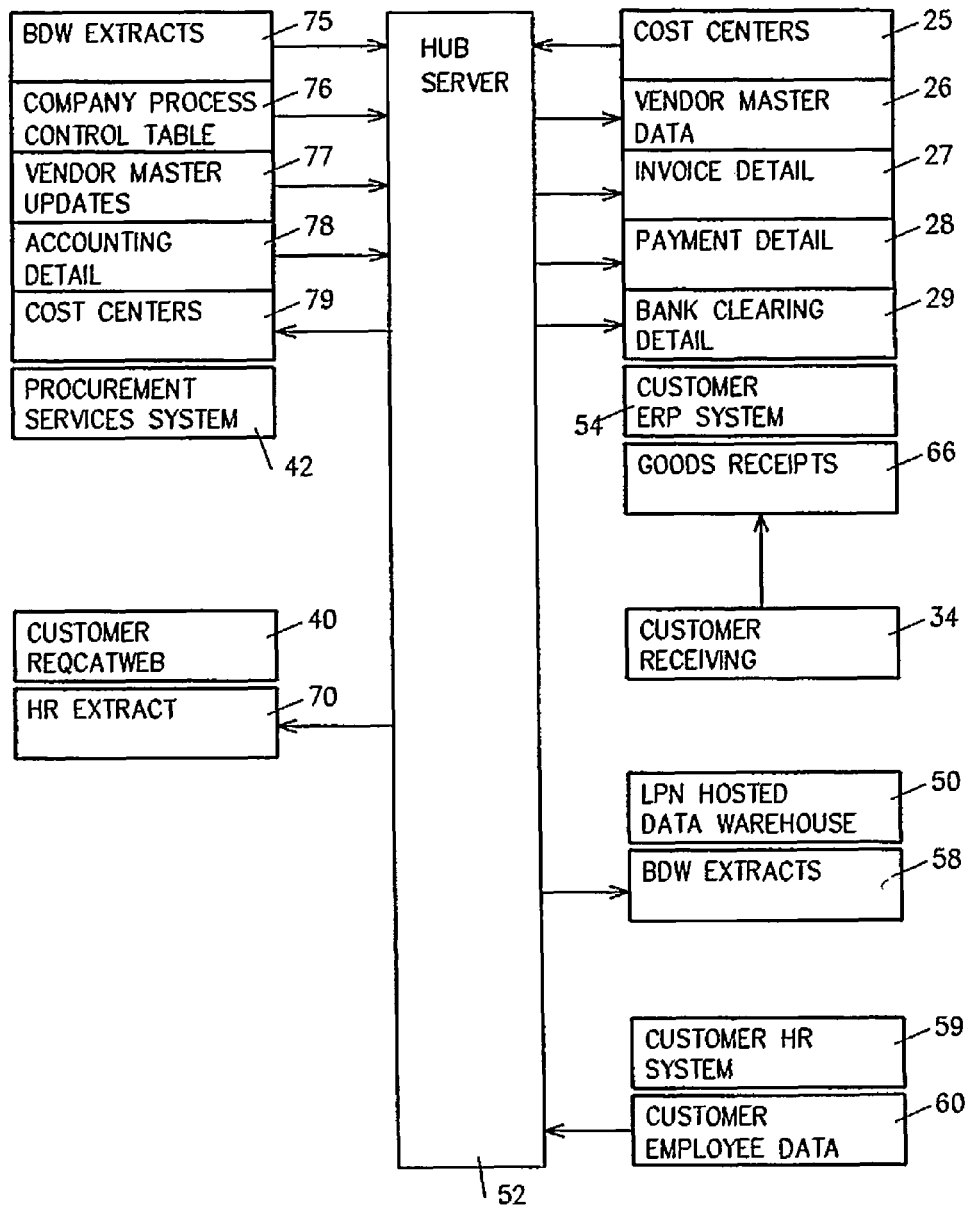
FIG. 6 is a diagram illustrating the inputs and outputs of the enterprise procurement services hub server 52 of the architecture of FIG. 2.

Referring to FIG. 6, enterprise procurement services hub server 52 receives as inputs from procurement system 42 BDW extracts 75, company process control table 76, vendor master updates 77 and accounting detail 78, and provides cost centers data 79 (which it receives from customer ERP system 54.) Hub server 52 provides human resource extract data 70, extracted from customer employee data 60, to customer RCW system 40.

Hub server 52 provides to customer ERP system 54 vendor master data 26, invoice detail 27, payment detail 28 and blank clearing detail data 29, and receives cost centers data 25. Customer ERP system 54 also receives goods receipts 66 from customer receiving 34.

Hub server 52 provides BDW extracts 58 to data warehouse 50.

The operation and inter relationships of elements of the architecture of FIGS. 2-6 pertinent to the present invention will be described hereafter in connection with preferred and exemplary embodiments of the systems and methods of the invention.

In accordance with the preferred embodiments of the invention, a front end order system, such as a procurement catalog and requisition system 40, is rendered enabled to accommodate multiple businesses 248, 249 with complex accounting rules while providing secure information viewing in support of those businesses and their processes. Companies having common ownership, and therefore similar accounting systems, are grouped in procurement coalitions 242 for volume discounts and access to shared contracts. Procurement contracts may also be leveraged across company groups 243, 242.

Both leveraging access and maintaining isolation of data is done by identifying a user at log on as associated with a company group. That association then dictates what the user can see and do.

With respect to catalogs, for example, a vendor sends his catalog in across the firewall to the EDI electronic data interchange. The RCW application loads it into the catalog. Users can come in to RCW, authorized by their user profile, from several company groups using common catalog—none knowing that the other uses it or has access to knowledge of requisitions applied against its line items. SAP assembles requisitions from all these users, and cuts purchase orders periodically for those requisitions from the same company group. By identifying those requisitions to a particular contract, volume specific terms and conditions, for example, are leverage on behalf of the companies and company groups. Catalogs are, in the preferred embodiment, controlled at the company level because this allows easier support of regional catalogs.

With respect to accounting, by driving accounting by company group, a user in one company within the company group may, for example, charge purchase to a user account in another company within the same company group.

Figure 7:
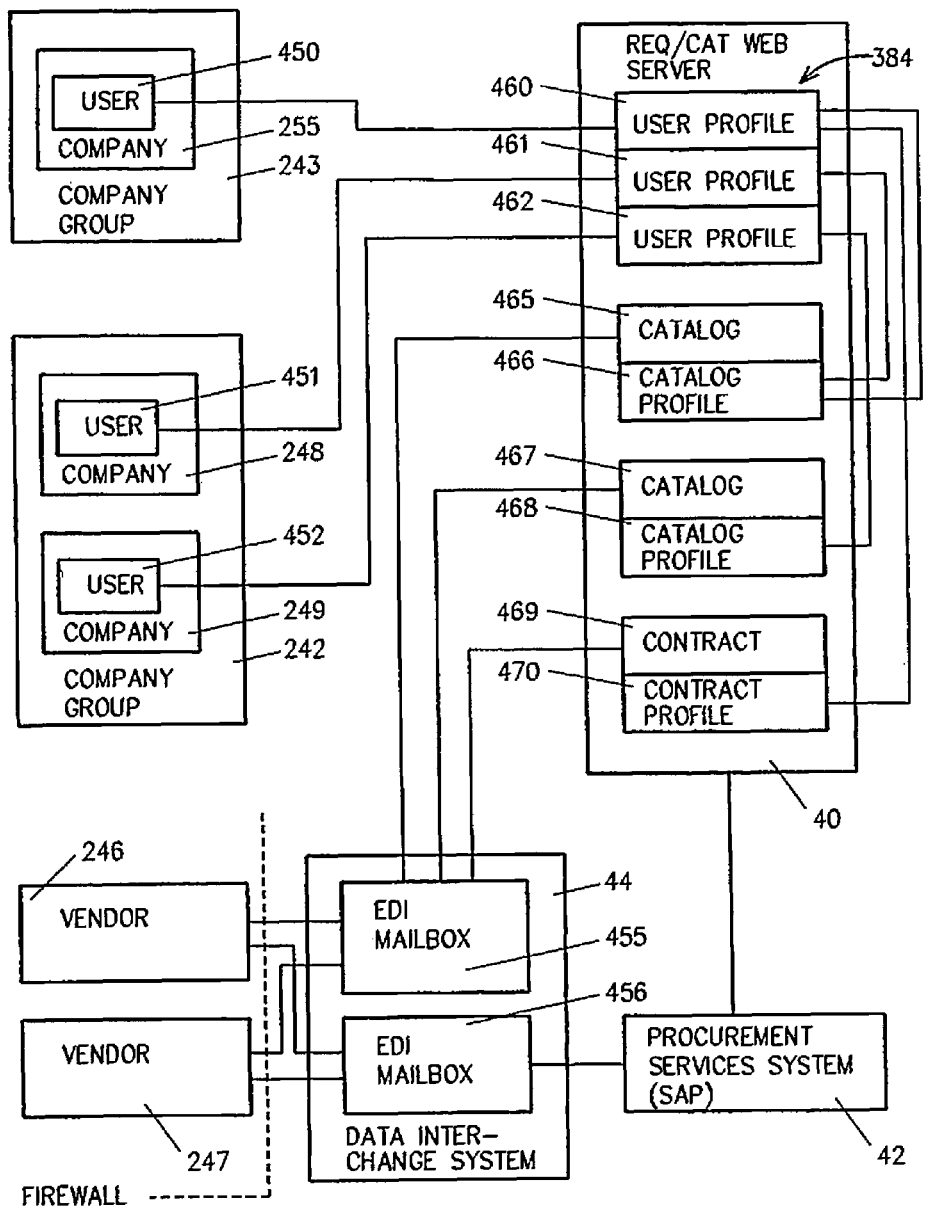
FIG. 7 is a diagram illustrating the use of user profiles and resource and process profiles in accordance with the preferred embodiment of the invention.

Referring to FIG. 7, the system of the preferred embodiment of the invention includes a plurality of companies 450-452 which are associated in company groups 242 and 243, requisition and catalog system 40, and procurement services system (SAP) 42. Associated with this system is a data interchange system 44, one of several possible communication paths with a plurality of vendors 246, 247. A company group may include one or more companies. Data interchange system 44 includes mail boxes 455, 456.

Users 450-452 are persons authorized by their respective companies to access requisition and catalog system 40. Requisition and catalog system 40 includes a user profile table 384 and a plurality of resources, shown here as catalogs 465, 476 and contract 469. Other examples of such resources include cost centers (that is, departments that can be charged), general ledger (G/L) account codes (that is, chart of accounts (COA)), user profile table 384 entries, business rules and defaults (such as those affiliated with accounting, specifying the fields that must be completed, for example, in creating a requisition and default data to be entered in those fields). All of these are generically referred to as procurement resources, and include process requirements and data resources accessible only to those users identified in their profiles as members of a particular company and, therefore, company group. (A company code will have a company group code associated with it.)

Figure 9:
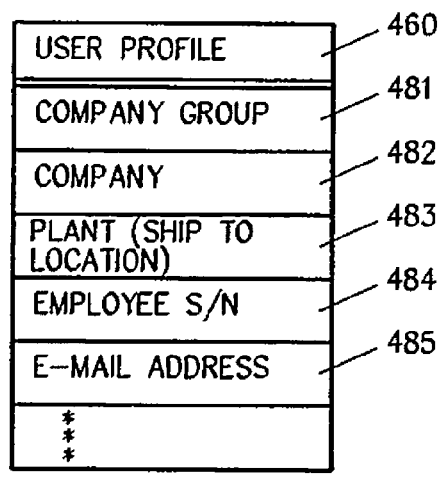
FIG. 9 is a diagram illustrating the content of a user profile.

Referring to FIG. 9, user profile 384 includes, for each user, company group code, company code, plant code (that is, ship to location), employee serial number, E-mail address, and much more (not pertinent to the present invention.)

Figure 8:
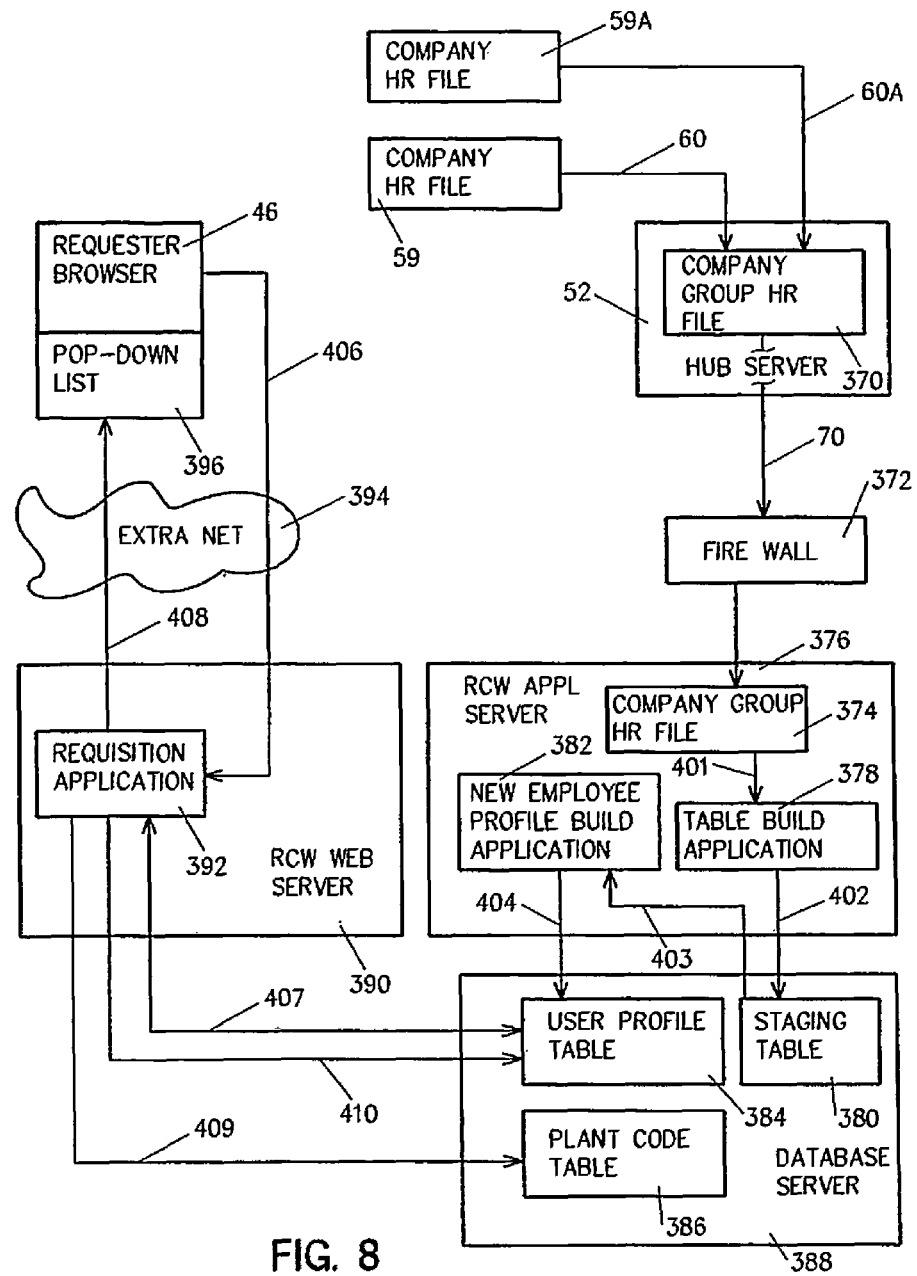
FIG. 8 is a diagram illustrating the creation and maintenance of a user profile.

Referring to FIG. 8, an exemplary system for creating and maintaining user profile table 384 is shown. A plurality of related companies 59, 59A are connected to a hub server which includes a company group human resources file. Hub server is connected through fire wall 372 to a requisition and catalog (ReqCatWeb, or RCW) application server 376. RCW server 374 includes a company group HR file, a staging table build application 378 and a new employee profile build application 382 for building employee profile table 384. Applications 402, 404 are logically connected to database server 388, which includes staging table 380, user profile table 384, and plant code table 386.

Connected to an RCW web server 390 deployed to customer companies through extra net 394 is a browser operable by a user for accessing a catalog (not shown) maintained by the enterprise, and for submitting to the enterprise requisitions for purchase of commodities and services against the accounts of a customer company. In exemplary embodiment, extra net 394 may be a secure network, such as a frame relay network connection, or a secure protocol on the world wide web.

The method for creating and maintaining user profile table 384 is further described in copending application Ser. No. 09/815, 318, filed Mar. 22, 2001.

Figure 10:
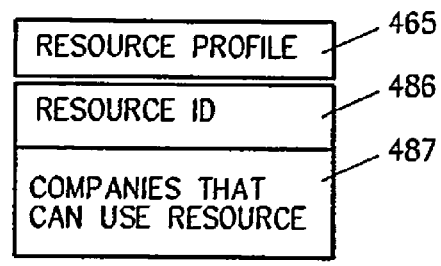
FIG. 10 is a diagram illustrating the content of a resource or process profile.
Figure 11:
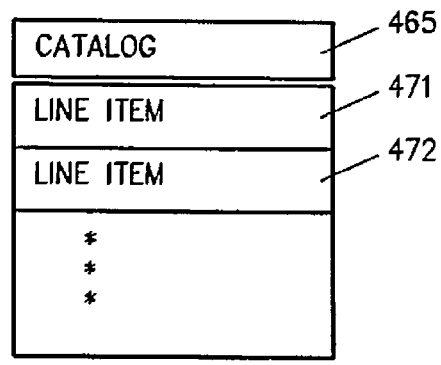
FIG. 11 is a diagram illustrating the content of a catalog.

Referring to FIG. 10 in connection with FIG. 7, associated with each company group resource 465, 467, 469 is a resource profile 466, 468, 470, respectively, containing a list, in the case of a catalog profile 466, of those companies, each associated with a company group, authorized to access catalog 465. This list may be maintained also at an item 471, 472 level.

As a user 451 logs in, his profile 461 code fields 482 and 481, respectively, will associate him with a given company 248 in a company group 242. When he clicks on shop-from-a-catalog button on his browser, catalog application code displays only those catalogs 465, 467 for which the profile 466, 468 includes his company in list 487 (this is at company level).

Other data that is similarly protected (other than catalogs), for example, include contracts 469, cost centers (departments that can be charged—a user can charge across companies 248, 249 in a company group, but not across company groups 243, 242), user profiles 384 (a user 451 may be able to initiate requests for other users 452—using button "change requester", which will bring up people in his company group, if configured to allow it.) More examples of resources protected by resource profiles 465 are accounting GL accounts codes that are associated with commodity codes by company group. Business rules associated with that accounting that are company group specific—and include accounting business rule defaults, such as fields required to be filled out based on what is being bought.

A given catalog 465 may, as controlled by catalog profile 466, be associated with more than one company within more than one company group. Business rules may require a user in a particular company group to buy from a particular catalog or catalogs, and such user will only see those catalogs associated with his company group. Information and resources are isolated to users by company group by associating company group with each data item that exists in the various data files and code procedures (for which such isolation is required).

Vendors 246, 247 may transmit catalog information to their respective catalogs 467, 469 via EDI mailbox 455.

Req/Cat Web server 40 assembles requisitions from users in all company groups and transfers these to procurement services system 42, which issues purchase orders to vendors 246, 247 for orders against their catalog. Invoices back from vendors 246, 247 are sent, in this example, back to SAP 42 via EDI 44 mailbox 456.

Figure 12:
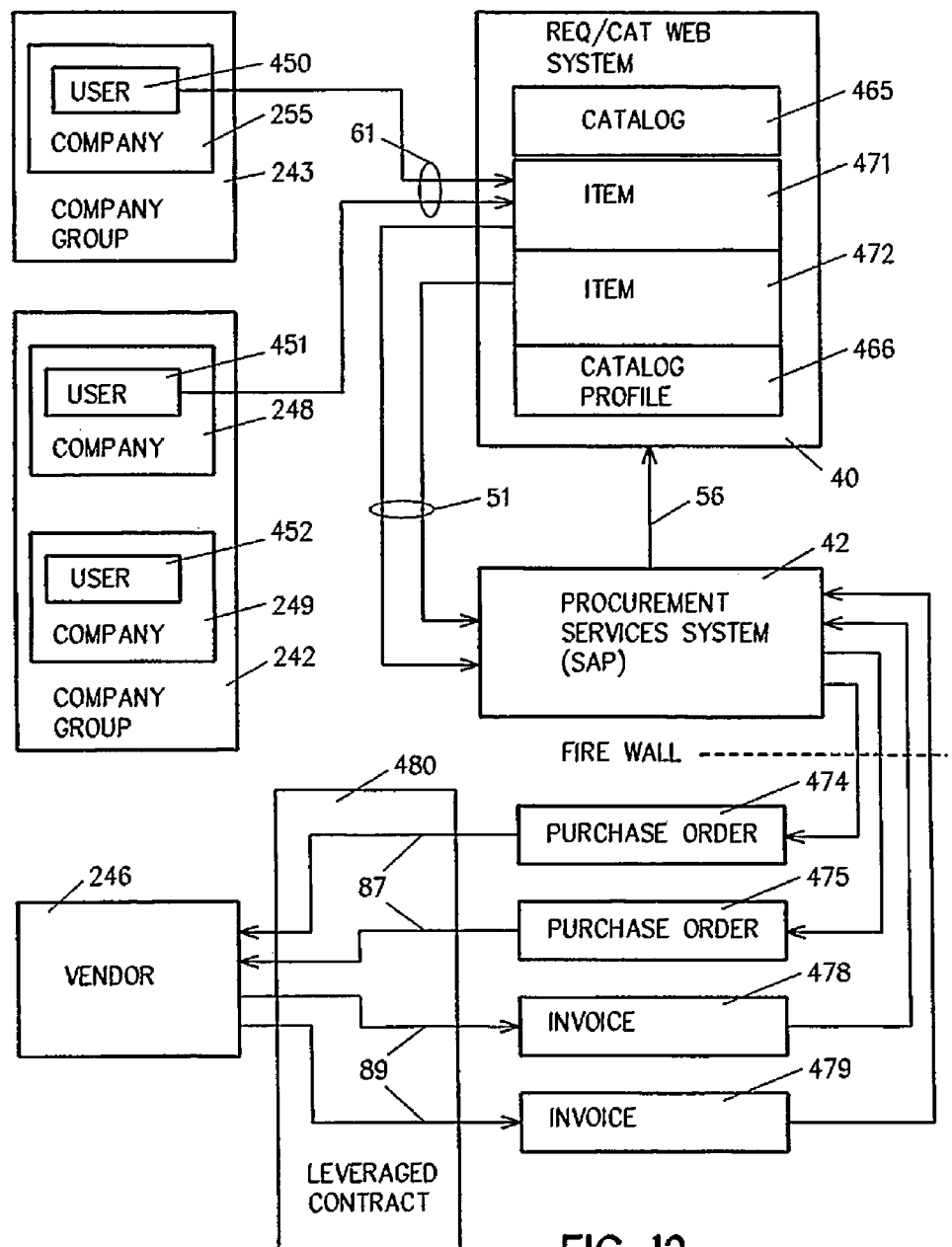
FIG. 12 is a diagram illustrating the leveraging of contract purchases across company groups.

Referring to FIG. 12, the manner in which purchases from users in different company groups are leveraged to achieve volume related costs with respect to leveraged contract 480 is described. As is represented by lines 61, users 450, 451 from different company groups may, in accordance with user profiles and catalog profile 466, as previously discussed, issue requisition requests against the same line item 471 in catalog 465. Other requests may be entered with respect to other items 472. These requisition requests are transferred, as represented by lines 51, to SAP 42. SAP 42 periodically (say, hourly or daily) cuts purchase orders 474, 475 to vendor 246, with separate purchase orders for requisition requests from each company group. Invoices 478, 479 are returned to SAP 42 and bridged to RCW 40 for confirmation processing prior to payment. Negative or positive confirmation processing is executed by Req/Cat Web server, as is more fully described in copending application Ser. No. 09/815,318, filed Mar. 22, 2001, and Ser. No. 09/815,313, filed Mar. 22, 2001, respectively, with separate confirmation requests sent to users indifferent company groups—this, again, providing information segregation and protection. However, volume commitments against contract 480 are leveraged by purchase orders from all company groups having access to items in vendor 246 catalog 465.

Similarly, buys against contract 469 (for example, a blanket purchase order for services from a vendor 247) may be leveraged by company group.

In this way, the preferred embodiments of the invention isolate information and processing required across multiple company groups by using profiles (user profile and resource and process profiles such as contract and catalog profiles). There is a profile provided for every element, resource, procedure, data, line item, G/L account—everything of any kind for which leveraging and isolation is to be achieved across company groups.

Advantages Over the Prior Art

It is an advantage of the invention that there is provided an improved system and method for procuring goods and services on behalf of customer companies.

It is a further advantage of the invention that there is provided a system and method for leveraging purchases of goods and services against the same volume specific contract by a plurality of unrelated customer companies.

It is a further advantage of the invention that there is provided a system and method for providing procurement services to a plurality of companies organized according to groups of related companies sharing access to selected resources across company groups and access to other resources only within company groups.

It is a further advantage of the invention that there is provided a system and method for leveraging purchasing across company groups while isolating information to individual company groups.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or apart of one or more, program elements, modules or objects generated from any programming language, such as C++, Java, Java Script, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for providing procurement resources and procurement services to a plurality of customer companies, said customer companies being organized in a plurality of customer company groups, said method comprising:
    associating, by a computer, a first customer company of the plurality of customer companies with a first company group of related customer companies of the plurality of customer companies, wherein the first company group comprises the first customer company;
    authorizing, by the computer, a set of customer companies of the plurality of customer companies (i) access to procurement resources and (ii) sharing each procurement resource to be shared among a plurality of users;
    creating, by the computer, a user profile for each user of a plurality of users, each user profile specifying (i) that each user is authorized by the first customer company to access procurement services and the procurement resources and (ii) the first customer company and the first company group of related customer companies;
    inserting, by the computer in a computer database, the created user profile for each user;
    providing, by the computer, access to volume discounts with respect to a plurality of vendors, to all customer companies in the first company group;
    specifying, by the computer, the volume discounts in shared contracts for purchase of items from the vendors by said all customer companies in the first company group, wherein the volume discounts specified in the shared contracts are based on volume specific terms in the shared contracts;
    providing, by the computer, a resource profile specifying for each procurement resource, the set of customer companies of the plurality of customer companies authorized for accessing and sharing each procurement resource to be shared among the plurality of users; and
    controlling, by the computer, access to the procurement resources based on: the first customer company, the first company group in the user profile for each user, and the resource profile for each procurement resource.

2. The method of claim 1, wherein all customer companies in the first company group are commonly owned by a same owner.

3. The method of claim 1, said method further comprising:
    receiving, by the computer, a request from a first user in the first company group to enter a first requisition for purchase of a first volume of a line item from a vendor of the plurality of vendors with respect to a leveraged contract specifying a volume discount, for purchase of the line item, based on volume specific terms in the leveraged contract;
    receiving, by the computer, a request from a second user in a second company group of related customer companies of the plurality of customer companies to enter a second requisition for purchase of a second volume of the line item from the vendor with respect to the leveraged contract; and
    determining, by the computer, that the first and second volumes of the line item collectively satisfy the volume specific terms in the leveraged contract, and in response, said computer providing to the vendor a first and second purchase order for purchase of the line item in accordance with the first and second requisition, respectively, wherein the first and second purchase orders each include the volume discount specified in the leveraged contract.

4. The method of claim 3, said method further comprising:
    receiving, by the computer, a charge for the purchase of the first volume of the line item to an account of another user in the first company group.

5. The method of claim 1, said method further comprising:
    providing, by the computer, said procurement resources in a front-end catalog and requisition server;
    receiving, by the computer, a user request from a first user in the first company group at a first client browser to log in to said front-end catalog and requisition server;
    providing, by the computer, a user interface at said first client browser for the first user to access only procurement resources, for purchasing items, authorized by said user profile for each user of the plurality of users and said resource profile for each procurement resource for purchasing items.

6. The method of claim 5, said method further comprising:
    receiving, by said front-end catalog and requisition server from a procurement services system, inputs of electronic data comprising a requisition status, a purchase order (PO) status, cost centers, currency exchange rates, general ledger (G/L) accounts, PO history invoices, and PO history receipts;
    sending, by said front-end catalog and requisition server to the procurement services system, outputs of electronic data comprising requisitions and positive confirmation responses;
    receiving, by said front-end catalog and requisition server from the first client browser, inputs of electronic data comprising a submit requisition;
    sending, by said front-end catalog and requisition server to the first client browser, outputs of electronic data comprising notice and response data;
    receiving, by said front-end catalog and requisition server, additional inputs of electronic data comprising vendor catalogs from vendors of the plurality of vendors, postal code validation data, human resource extract data, and approve/reject data with respect to customer approve.

7. The method of claim 5, said method further comprising:
    including, by the computer, accounting general ledger codes with company group specific accounting rules and defaults in said procurement resources.

8. A system for providing a procurement resources and procurement services to a plurality of customer companies, said customer companies being organized in a plurality of customer company groups, said system comprising:
    a computer;
    a computer readable hardware storage device comprising program code which, upon being executed by the computer, provides a procurement resource and procurement services to a plurality of customer companies, said customer companies being organized in a plurality of customer company groups, comprising the steps of:
    associating a first customer company of the plurality of customer companies with a first company group of related customer companies of the plurality of customer companies, wherein the first company group comprises the first customer company;

authorizing a set of customer companies of the plurality of customer companies (i) access to procurement resources and (ii) sharing each procurement resource to be shared among a plurality of users;

creating a user profile for each user of a plurality of users, each user profile specifying (i) that each user is authorized by the first customer company to access procurement services and the procurement resources and (ii) the first customer company and the first company group of related customer companies;

inserting, in a computer database, the created user profile for each user;

providing access to volume discounts with respect to a plurality of vendors, to all customer companies in the first company group;

specifying the volume discounts in shared contracts for purchase of items from the vendors by said all customer companies in the first company group, wherein the volume discounts specified in the shared contracts are based on volume specific terms in the shared contracts;

providing a resource profile specifying for each procurement resource, the set of customer companies of the plurality of customer companies authorized for accessing and sharing each procurement resource to be shared among the plurality of users; and controlling access to the procurement resources based on: the first customer company, the first company group in the user profile for each user, and the resource profile for each procurement resource.

9. The system of claim 8, wherein all customer companies in the first company group are commonly owned by a same owner.

10. The system of claim 8, further comprising the steps of:
receiving a request from a first user in the first company group to enter a first requisition for purchase of a first volume of a line item from a vendor of the plurality of vendors with respect to a leveraged contract specifying a volume discount, for purchase of the line item, based on volume specific terms in the leveraged contract;

receiving a request from a second user in a second company group of related customer companies of the plurality of customer companies to enter a second requisition for purchase of a second volume of the line item from the vendor with respect to the leveraged contract; and determining that the first and second volumes of the line item collectively satisfy the volume specific terms in the leveraged contract, and in response, said computer providing to the vendor a first and second purchase order for purchase of the line item in accordance with the first and second requisition, respectively, wherein the first and second purchase orders each include the volume discount specified in the leveraged contract.

11. The system of claim 10, further comprising the step of:
receiving a charge for the purchase of the first volume of the line item to an account of another user in the first company group.

12. The system of claim 8, further comprising the steps of:
providing said procurement resources in a front-end catalog and requisition server;

receiving a user request from a first user in the first company group at a first client browser to log in to said front-end catalog and requisition server;

providing a user interface at said first client browser for the first user to access only procurement resources, for purchasing items, authorized by said user profile for each user of the plurality of users and said resource profile for each procurement resource for purchasing items.

13. The system of claim 12, further comprising the steps of:
receiving, by said front-end catalog and requisition server from a procurement services system, inputs of electronic data comprising a requisition status, a purchase order (PO) status, cost centers, currency exchange rates, general ledger (G/L) accounts, PO history invoices, and PO history receipts;

sending, by said front-end catalog and requisition server to the procurement services system, outputs of electronic data comprising requisitions and positive confirmation responses;

receiving, by said front-end catalog and requisition server from the first client browser, inputs of electronic data comprising a submit requisition;

sending, by said front-end catalog and requisition server to the first client browser, outputs of electronic data comprising notice and response data;

receiving, by said front-end catalog and requisition server, additional inputs of electronic data comprising vendor catalogs from vendors of the plurality of vendors, postal code validation data, human resource extract data, and approve/reject data with respect to customer approve.

14. The system of claim 12, further comprising the step of:
including accounting general ledger codes with company group specific accounting rules and defaults in said procurement resources.

15. A computer readable hardware storage device comprising program code which, upon being executed by a computer, provides a procurement resources and procurement services to a plurality of customer companies, said customer companies being organized in a plurality of customer company groups, comprising the steps of:

associating a first customer company of the plurality of customer companies with a first company group of related customer companies of the plurality of customer companies, wherein the first company group comprises the first customer company;

authorizing a set of customer companies of the plurality of customer companies (i) access to procurement resources and (ii) sharing each procurement resource to be shared among a plurality of users;

creating a user profile for each user of a plurality of users, each user profile specifying (i) that each user is authorized by the first customer company to access procurement services and the procurement resources and (ii) the first customer company and the first company group of related customer companies;

inserting, in a computer database, the created user profile for each user;

providing access to volume discounts with respect to a plurality of vendors, to all customer companies in the first company group;

specifying the volume discounts in shared contracts for purchase of items from the vendors by said all customer companies in the first company group, wherein the volume discounts specified in the shared contracts are based on volume specific terms in the shared contracts;

providing a resource profile specifying for each procurement resource, the set of customer companies of the plurality of customer companies authorized for accessing and sharing each procurement resource to be shared among the plurality of users; and controlling access to the procurement resources based on: the first customer company, the first company group in the user profile for each user, and the resource profile for each procurement resource.

16. The computer readable hardware storage device of claim 15, wherein all customer companies in the first company group are commonly owned by a same owner.

17. The computer readable hardware storage device of claim 15, further comprising the steps of:

receiving, a request from a first user in the first company group to enter a first requisition for purchase of a first volume of a line item from a vendor of the plurality of vendors with respect to a leveraged contract specifying a volume discount, for purchase of the line item, based on volume specific terms in the leveraged contract;

receiving a request from a second user in a second company group of related customer companies of the plurality of customer companies to enter a second requisition for purchase of a second volume of the line item from the vendor with respect to the leveraged contract; and determining that the first and second volumes of the line item collectively satisfy the volume specific terms in the leveraged contract, and in response, said computer providing to the vendor a first and second purchase order for purchase of the line item in accordance with the first and second requisition, respectively, wherein the first and second purchase orders each include the volume discount specified in the leveraged contract.

18. The computer readable hardware storage device of claim 17, further comprising the step of:

receiving a charge for the purchase of the first volume of the line item to an account of another user in the first company group.

19. The computer readable hardware storage device of claim 15, further comprising the steps of:

providing said procurement resources in a front-end catalog and requisition server;

receiving a user request from a first user in the first company group at a first client browser to log in to said front-end catalog and requisition server;

providing, by the computer, a user interface at said first client browser for the first user to access only procurement resources, for purchasing items, authorized by said user profile for each user of the plurality of users and said resource profile for each procurement resource for purchasing items.

20. The computer readable hardware storage device of claim 19, further comprising the steps of:

receiving, by said front-end catalog and requisition server from a procurement services system, inputs of electronic data comprising a requisition status, a purchase order (PO) status, cost centers, currency exchange rates, general ledger (G/L) accounts, PO history invoices, and PO history receipts;

sending, by said front-end catalog and requisition server to the procurement services system, outputs of electronic data comprising requisitions and positive confirmation responses;

receiving, by said front-end catalog and requisition server from the first client browser, inputs of electronic data comprising a submit requisition;

sending, by said front-end catalog and requisition server to the first client browser, outputs of electronic data comprising notice and response data;

receiving, by said front-end catalog and requisition server, additional inputs of electronic data comprising vendor catalogs from vendors of the plurality of vendors, postal code validation data, human resource extract data, and approve/reject data with respect to customer approve.

* * * * *